Patented Aug. 26, 1924.

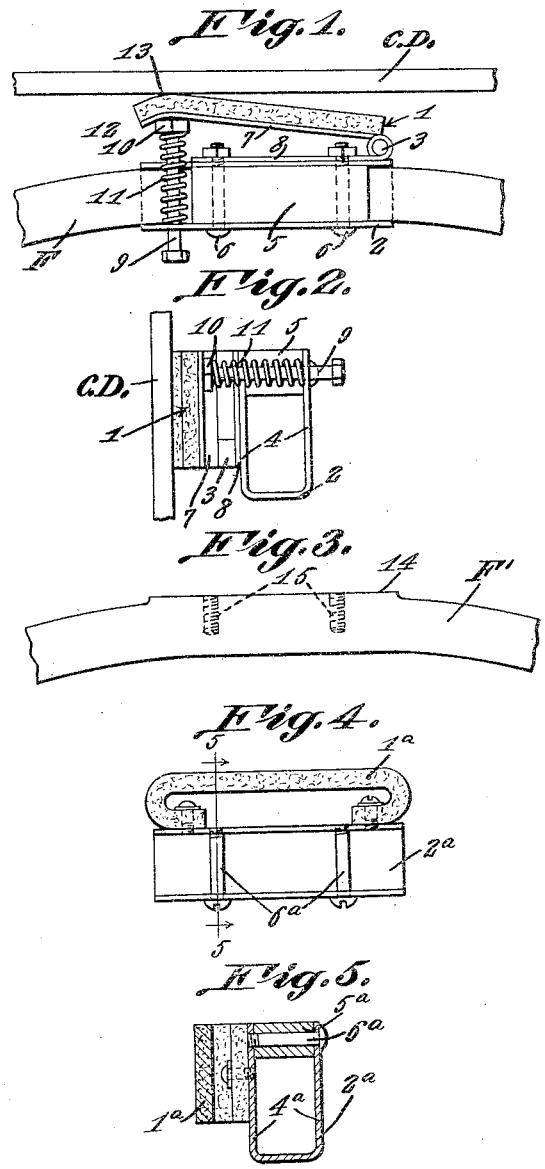

1,505,941

UNITED STATES PATENT OFFICE.

JACOB S. BIDDLE AND JAMES P. THOMPSON, OF LEAVENWORTH, KANSAS.

CLUTCH BRAKE.

Application filed September 4, 1923. Serial No. 660,866.

*To all whom it may concern:*

Be it known that we, JACOB S. BIDDLE and JAMES P. THOMPSON, citizens of the United States, residing at Leavenworth, in the county of Leavenworth and State of Kansas, have invented a new and useful Clutch Brake, of which the following is a specification.

This invention relates to brakes for disk clutches.

The object of the invention is to provide a brake to prevent spinning of a disk clutch during shifting of the gears.

Another object is to provide a brake of this character which may be readily attached in such a way as to meet the clutch as it is being thrown out and in the same operation prevents spinning of the clutch.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 represents a side elevation of a brake constructed in accordance with this invention shown applied and partly compressed to illustrate the point of friction.

Fig. 2 is a transverse section taken on the line 2—2 of Fig. 1.

Fig. 3 is a side elevation of a clutch release fork constructed with a seat to receive the brake attachment.

Fig. 4 is a plan view of a slightly different form of brake; and

Fig. 5 is a transverse section taken on the line 5—5 of Fig. 4.

The brake illustrated in Figs. 1 and 2 includes a braking element 1 and an attaching clamp 2 hingedly connected as shown at 3. The clamp 2 is made U-shaped in cross section and preferably constructed of pliable metal to provide for the side walls 4 being spread apart to permit the clamp to receive the clutch release fork F or other support to which it is to be attached. The side members or legs 4 of the clamp are of a width greater than that of the fork so that blocks 5 may be inserted between the legs to prevent them from being forced out of shape when the attaching bolts 6 are applied.

The braking element 1 which may be composed of leather, asbestos brake lining or other suitable material is shown secured to a plate 7 which plate is hinged at 3 to another plate 8 secured to the outer face of the clamp 2 by the bolts 6 which connect the clamp to its support.

A bolt 9 extends transversely through one side member of the clamp 2 and is connected with the free end of plate 7 and adjusting nut 10 being provided to vary the tension of a coiled spring 11 which is mounted on the bolt between said nut and the clamp as is shown clearly in Figs. 1 and 2. The spring 11 exerts its tension to normally force plate 7 with the braking material 1 secured thereto outward for contact with the clutch disk CD. The brake carried plate 7 has its free end bent as shown at 12 to provide a contacting point 13 between the disk and the brake and which constitutes the friction point of the brake.

It will thus be seen that when the clutch is thrown out the braking element 1 will engage it and the friction exerted thereby will prevent the disk from spinning.

In the form shown in Figs. 4 and 5 the spring 11 is omitted and the braking element 1ª is shown mounted at both ends on the outer face of the clamp 2ª the ends of said element being turned inwardly and secured to the clamp by screws. This arrangement of the braking element 1ª positions it in the path of the clutch disk so that when the clutch is thrown out this element will frictionally engage it and prevent its spinning.

In Fig. 3 the clutch release fork F' is shown constructed with a seat 14 having threaded sockets 15 to receive the brake attachment.

From the above it will be obvious that the device constituting this invention may be applied to cars already operating and that it can be used either with or without a spring.

Various changes in the form, shape, proportion and other minor details of construction may be made without departing from the principle or sacrificing any of the advantages of the claimed invention.

We claim:—

1. A disk clutch brake comprising a braking element to be located in the path of a disk clutch and having means for attaching it to a support, said means comprising a clamp U-shaped in cross section to straddle a support, means for securing said member in operative position and a braking element carried by the outer face of said member and adapted to lie in the path of a disk clutch so that when the clutch is thrown out it will be frictionally engaged by said braking element.

2. A disk clutch brake comprising a clamp for connection with a support, a braking element hinged to said support, and a spring connected to normally project said braking element to hold it in the path of a disk clutch.

In testimony that we claim the foregoing as our own, we have hereto affixed our signatures.

JACOB S. BIDDLE.
JAMES P. THOMPSON.